US012773978B2

(12) United States Patent
Wehlen et al.

(10) Patent No.: US 12,773,978 B2
(45) Date of Patent: Oct. 27, 2026

(54) MODEL-BASED PREDICTIVE CONTROL OF A MOTOR VEHICLE

(71) Applicant: ZF Friedrichshafen AG, Friedrichshafen (DE)

(72) Inventors: Timo Wehlen, Friedrichshafen (DE); Timon Busse, Munich (DE); Valerie Engel, Markdorf (DE); Lorenz Fischer, Friedrichshafen (DE); Matthias Zink, Kressbronn (DE); Julia Stecher, Friedrichshafen-Ettenkirch (DE); Lothar Kiltz, Ravensburg (DE); Andreas Wendzel, Grünkraut (DE); Vasilis Lefkopoulos, Grünkraut (CH); Joachim Ferreau, Zurich (CH)

(73) Assignee: ZF Friedrichshafen AG, Friedrichshafen (DE)

( * ) Notice: Subject to any disclaimer, the term of this patent is extended or adjusted under 35 U.S.C. 154(b) by 244 days.

(21) Appl. No.: 18/688,638

(22) PCT Filed: Sep. 3, 2021

(86) PCT No.: PCT/EP2021/074380
§ 371 (c)(1),
(2) Date: Mar. 1, 2024

(87) PCT Pub. No.: WO2023/030644
PCT Pub. Date: Mar. 9, 2023

(65) Prior Publication Data
US 2025/0115231 A1 Apr. 10, 2025

(51) Int. Cl.
*B60W 20/11* (2016.01)
*B60W 10/18* (2012.01)

(52) U.S. Cl.
CPC ............ *B60W 20/11* (2016.01); *B60W 10/18* (2013.01); *B60W 2510/244* (2013.01); *B60W 2520/10* (2013.01); *B60W 2520/30* (2013.01)

(58) Field of Classification Search
CPC ................. B60W 20/11; B60W 10/18; B60W 2510/244; B60W 2520/10;
(Continued)

(56) References Cited

U.S. PATENT DOCUMENTS

2021/0221386 A1* 7/2021 Quirynen ............ B60W 60/001
2022/0242413 A1* 8/2022 Jing ...................... B60W 10/10

FOREIGN PATENT DOCUMENTS

DE 10 2019 105 665 A1 9/2020
DE 10 2020 203 742 A1 9/2021
WO WO 2021/093954 A1 5/2021

OTHER PUBLICATIONS

English description for DE102019105665 (Year: 2019).*
(Continued)

*Primary Examiner* — Jason Holloway
(74) *Attorney, Agent, or Firm* — Crowell & Moring LLP

(57) ABSTRACT

Model-based predictive control (MPC) of a motor vehicle involves an MPC algorithm, which comprises a high level solver module to calculate a high level longitudinal trajectory for an upcoming route segment, according to which the motor vehicle is to travel within a route-based high level prediction horizon. The high level longitudinal trajectory is sent to a tracker solver module in the MPC algorithm as an input value, which calculates a tracker longitudinal trajectory on the basis of the high level longitudinal trajectory, according to which the motor vehicle is to travel within the time-based tracker prediction horizon, wherein the tracker prediction horizon is shorter than the high level prediction
(Continued)

Figure 1:
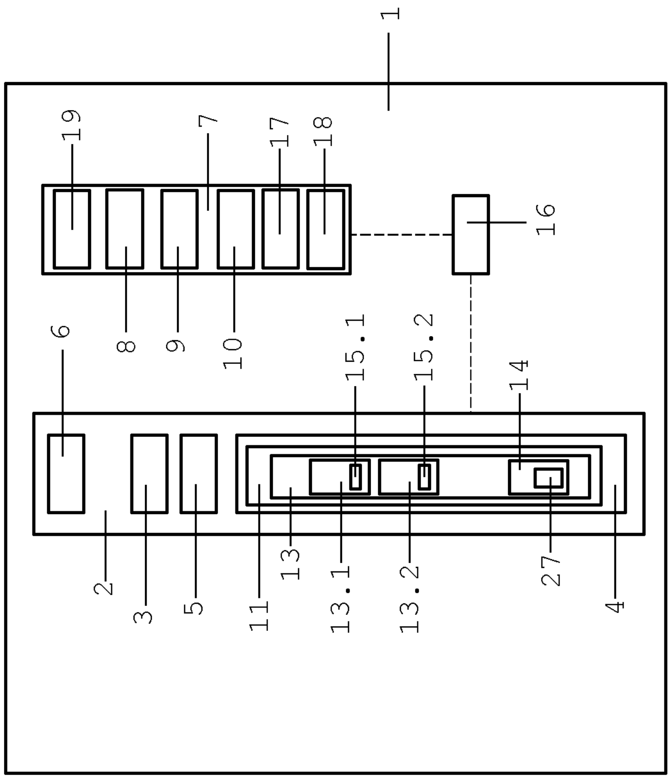

Fig. 4 horizon, such that the tracker prediction horizon only covers a portion of the high level prediction horizon.

10 Claims, 3 Drawing Sheets

(58) Field of Classification Search
CPC ......... B60W 2520/30; B60W 2710/18; B60W 2710/244; B60W 2720/10; B60W 10/26; B60W 2050/0002; B60W 2050/0006; B60W 2050/0014; B60K 6/48; B60K 6/442
See application file for complete search history.

(56) References Cited

OTHER PUBLICATIONS

International Search Report and Written Opinion received for Application No. PCT/EP2021/074380 mailed Jun. 14, 2022 (11 pages).

* cited by examiner

MODEL-BASED PREDICTIVE CONTROL OF A MOTOR VEHICLE

CROSS-REFERENCE TO RELATED APPLICATIONS

This application is a U.S. national stage application under 35 U.S.C. § 371 of PCT Application No. PCT/EP2021/074380, filed on Sep. 3, 2021, and published as WO 2023/030644 A1 on Mar. 9, 2023, the entirety of which is hereby fully incorporated by reference herein.

The invention relates to model-based predictive control of a motor vehicle. In particular, a method for model-based predictive control of a motor vehicle is claimed.

Current intelligent cruise controls (so-called "predictive green ACCs") for motor vehicles are able to take route topology into account, but the driving strategy and thus the longitudinal control is rule-based. This rule-based implementation normally results in less than optimal solutions with regard to fuel consumption, comfort, and driving time. As the drive systems become more complex, these rules become more complex and require more computing power. An optimal operation of a vehicle (e.g. with regard to fuel consumption, comfort, and driving time) can only be achieved with familiarity with the route. A driver of the motor vehicle must therefore drive proactively, but only has limited knowledge of the route ahead, and no knowledge of upcoming driving obstacles.

The object of the present invention is to create a method for controlling a motor vehicle, that takes the problems described above into account. This problem is solved by the subject matter of the independent claims. Advantageous embodiments are the subject matter of the dependent claims, the following description, and the drawings.

The present invention uses the model predictive control (MPC) approach. There are three steps used in such model-based predictive control. In the first step, a virtual driving horizon (prediction horizon) is created from available maps and sensor data. The prediction horizon forms the solution space for a trajectory planner and controller in which the longitudinal trajectory of the motor vehicle, e.g. the speed or torque trajectory, is generated. In a second step, an iterative online generation and control of a longitudinal trajectory takes place, optimizing the trajectory with regard to performance goals in accordance with the MPC approach. In a third step, the trajectory is implemented automatically. The present invention contains a modification of the second step in this process, such that certain computing time requirements can be met for mass production. For this, the present invention creates an architecture with which the second step can be carried out and the computing times required for mass production can be met.

In particular, the present invention results in a functional architecture comprising two model-based predictive controllers (MPC solvers) that work sequentially, which are then supplemented by a downstream post processing unit in one embodiment. The two MPC solvers can be referred to as a high level solver (HLS) and a tracker. The high level solver module assumes the long-term planning of the longitudinal trajectory and uses the MPC approach for this. The rough long-term planning of the trajectory is based on the route. This allows for a correct, optimal dealing with inanimate horizon objects (inclines, speed limits, other traffic signs, e.g. "Stop" and "Yield," and curves). The length of the travel horizon can range from 50 meters to 5,000 meters. Dynamic horizon objects can also be fundamentally taken into account, e.g. traffic lights. This is only roughly, due to the long computing times. The trajectory adjusted for dynamic objects may need to be overwritten by a quicker system. The high level solver therefore does not send a direct trajectory preference to the vehicle. Instead, the desired trajectory is further processed in the quicker tracker.

In this regard, a method for model-based predictive control of a motor vehicle is created. In one step, an MPC algorithm is carried out, which comprises a high level solver module, in which, when the high level solver module is applied to an upcoming route segment, a high level longitudinal trajectory is calculated, according to which the motor vehicle is to travel within a route-based high level prediction horizon. The high level solver module solves a non-linear problem in particular, and works with continuous compensation variables for discrete states (e.g. gears). This approach has less effect on the solution space than when discrete operating states are taken into consideration. This has advantages with regard to obtaining optimal results.

The high level longitudinal trajectory calculated by the high level solver module is sent to a tracker solver module in the MPC algorithm as an input value. The tracker solver module calculates a tracker longitudinal trajectory based on the high level longitudinal trajectory calculated by the high level solver module for a time period in the future, according to which the motor vehicle is to travel in a time-based tracker prediction horizon. The tracker prediction horizon is shorter than the high level prediction horizon, and therefore only covers a portion of the high level prediction horizon, e.g. an initial segment thereof. The tracker solver module is distinguished by quick computing times and reliability. When current solutions from the high level solver module are unavailable, the tracker solver module can supply torques, for example, based on the most recent solutions from the high level solver module.

Because the high level solver module assumes the rough long-term planning, it can be expected that this process requires significant computing time, regardless of the hardware. It is therefore advantageous to deal with dynamic horizon objects (other vehicles or road users) in the tracker solver module, with a higher computing frequency. To enable this, the tracker solver module works with a significantly shorter forecast than the high level solver module. Unlike the high level solver module, the tracker solver module is time-based. This results in a fundamental compatibility to the arbitration system.

The tracker solver module generates a desired trajectory, which can theoretically correspond to the desired trajectory from the high level solver module, but is time-based and high resolution. The longitudinal trajectory of the tracker solver module also differs from that of the high level solver module in that it has a higher cycling rate, which is enabled by the shorter forecast time. In this regard, the tracker longitudinal trajectory is calculated with a higher resolution than the high level longitudinal trajectory in one embodiment.

It is particularly advantageous if the length of the prediction horizon is between 50 meters and 5,000 meters. The speed trajectory of the vehicle can still be optimized online even if the forecast over the route is relatively long or far, e.g. with a forecast of a few kilometers. This requires a lot of computing. It is advantageous to calculate the trajectory for a relatively short forecast with the tracker solver module, e.g. for the region immediately in front of the motor vehicle. This allows for particularly short reaction times. In this regard, the length of the high level prediction horizon is set to between 50 meters and 5,000 meters in one embodiment. The tracker longitudinal trajectory can be calculated by the tracker solver module for a few seconds (or less) of the initial segment of the high level prediction horizon immediately in front of the motor vehicle.

In another embodiment, signal post processing (SPP) is used. Signal post processing involves subsequent processing of signals. In this case, partial results calculated in advance at different times are linked to one another such that they are in a temporal relationship to one another. This results in a time interval in which all of the information is available. The temporal basis is that of the tracker in particular. Moreover, the SPP and tracker are implemented in the same software module, such that they have the same temporal basis. In this regard, the tracker longitudinal trajectory calculated in the tracker solver module is sent to a post processing unit as an input in another embodiment, where it is processed to obtain a control signal. The motor vehicle can subsequently be controlled on the basis of this control signal. The post processing unit can be downstream of the model-based predictive control. The post processing unit converts the tracker longitudinal trajectory into desired torques and desired forces, in particular without using model-based predictive control.

The MPC algorithm comprises a longitudinal dynamics model and a high level cost function that is dedicated to the high level solver module, and the high level longitudinal trajectory is calculated taking the longitudinal dynamics model into account while minimizing the high level cost function. In a similar manner, the tracker solver module can have a dedicated tracker cost function, and the tracker longitudinal trajectory can be calculated taking the longitudinal dynamics model into account while minimizing the tracker cost function. The output from the tracker solver module can have a direct impact on driving comfort through the minimization of the tracker-specific cost function.

The high level solver module can deliver desired speed patterns, a charging state of the vehicle battery, drive forces, drive torques, braking forces, or braking torques as outputs. In this regard, the high level longitudinal trajectory comprises a speed trajectory in one embodiment, according to which the motor vehicle is to travel within the high level prediction horizon.

The high level longitudinal trajectory can also comprise the course of the charging state of a battery used to store energy for an electric machine in the motor vehicle with which the vehicle is powered. The charging state (or State of Charge: SoC) is the current amount of energy in the battery in relation to its maximum charge.

The high level and/or tracker longitudinal trajectories can also comprise a braking force trajectory for the brakes in the motor vehicle, according to which the brakes are to provide braking forces (weaker to none) within the high level prediction horizon, or within the tracker prediction horizon. Instead of the aforementioned drive forces and braking forces, drive torques and braking torques can be determined by the longitudinal trajectory. The torque trajectories relate to the torques for at least one wheel on the motor vehicle, and comprise both positive and negative torques that are to be provided by the electric machine, internal combustion engine, and brakes in the motor vehicle.

The tracker longitudinal trajectory can comprise a torque trajectory for at least one drive assembly (e.g. an electric machine) in the motor vehicle, according to which the at least one drive assembly is to provide drive torques within the tracker prediction horizon.

Figure 2:
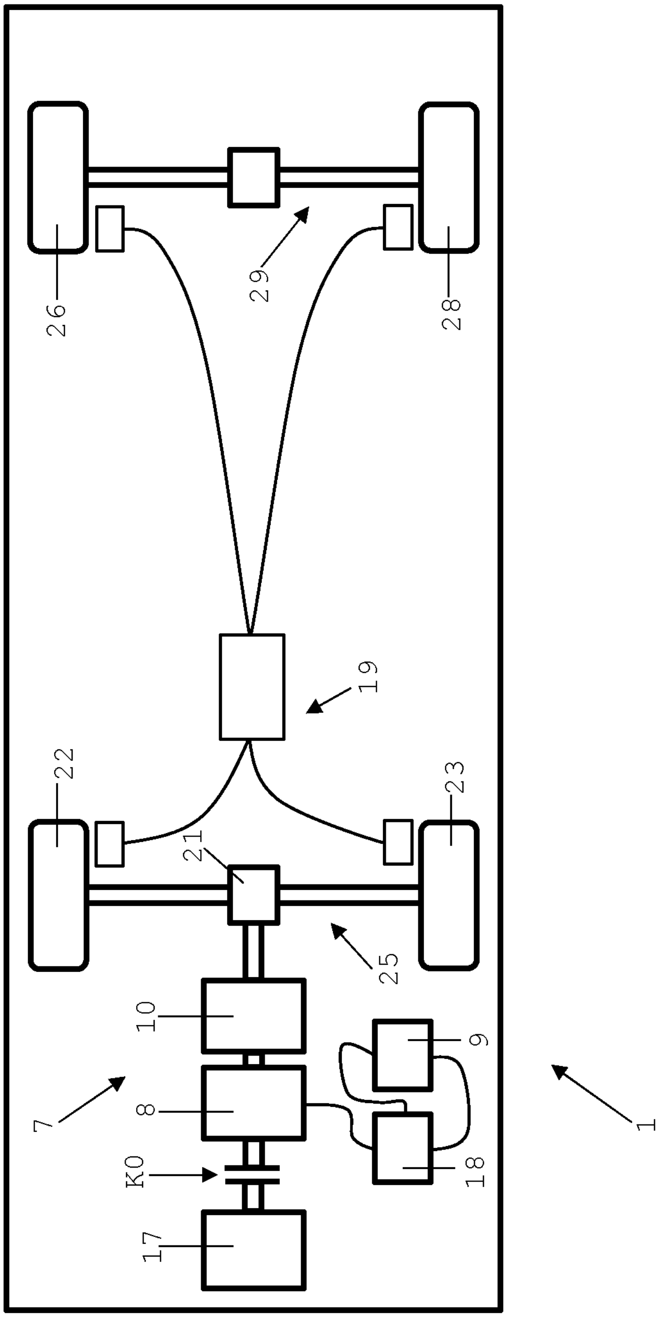
Figure 3:
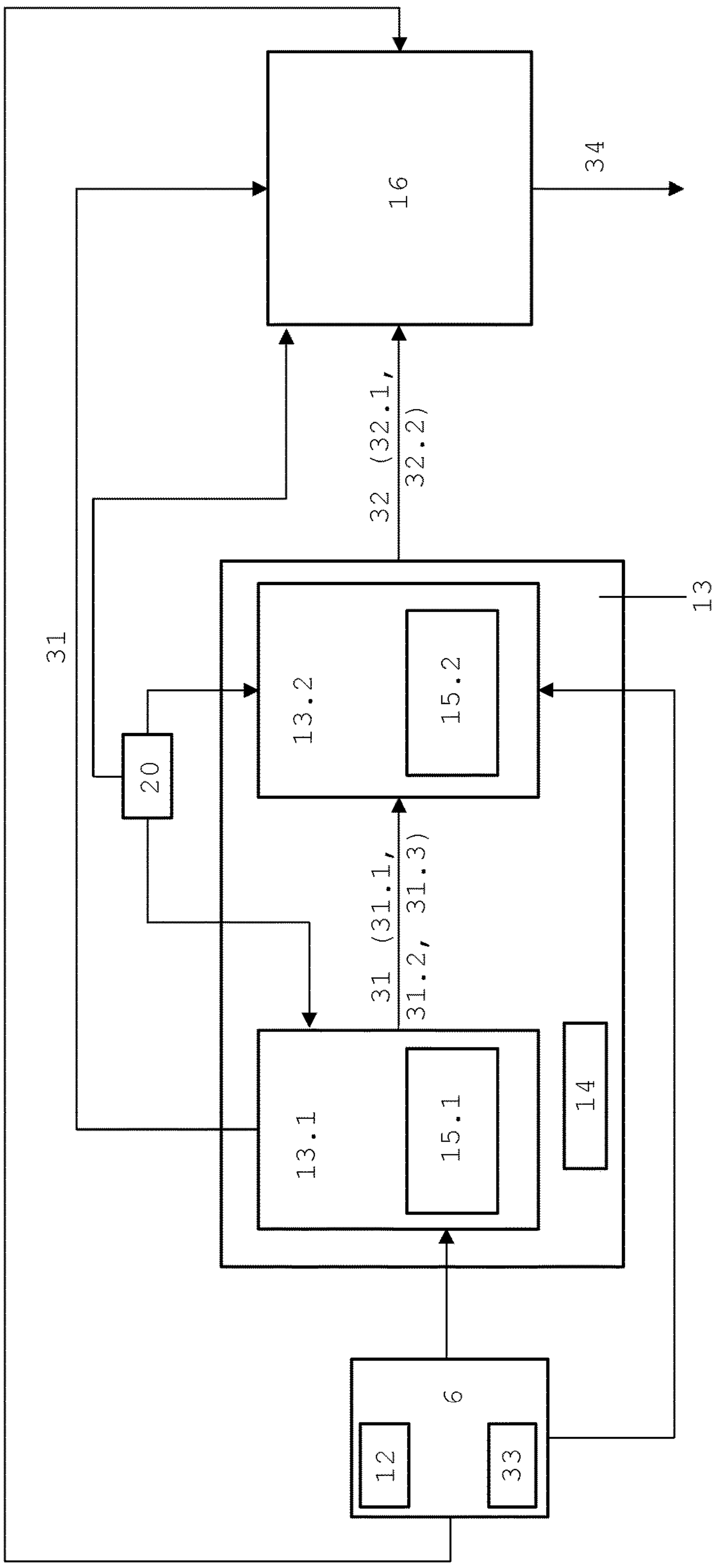
Figure 4:
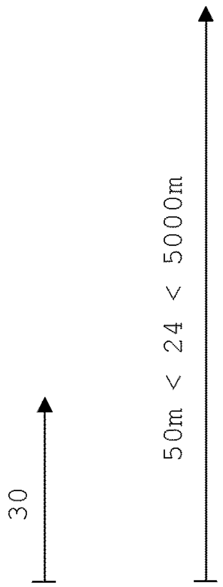

Exemplary embodiments of the invention shall be explained in greater detail below in reference to the schematic drawings, in which the same or similar elements have the same reference symbols. Therein:

FIG. 1 shows a schematic illustration of a motor vehicle, the drive train of which comprises an internal combustion engine, an electric machine, and brakes, FIG. 2 shows details of an exemplary drive train for the motor vehicle in FIG. 1, FIG. 3 shows an exemplary embodiment of a method according to the invention for model-based predictive control of the motor vehicle in FIG. 1, FIG. 4 shows two different prediction horizons for the method according to claim 4.

FIG. 1 shows a motor vehicle 1, e.g. a passenger automobile. The motor vehicle 1 comprises a system 2 for model-based predictive control of the motor vehicle 1. The system 2 comprises a processor 3, a memory 4, a communication interface 5, and a detection unit 6, in particular for detecting state data relating to the motor vehicle 1, in this exemplary embodiment.

The motor vehicle 1 also has a drive train 7, which can comprise an electric machine 8, which can be operated as a motor and a generator, a battery 9, a transmission 10, and brakes 19. The electric machine 8 can drive the wheels of the motor vehicle 1 via the transmission 10 when used as a motor. The electricity needed for this comes from the battery 9, in particular via power electronics 18. The battery 9 can also be charged by the electric machine 8 via the power electronics 18, when the electric machine is used as a generator (recuperation). The battery 9 can also be charged at an external charging station.

FIG. 2 also shows that the drive train 7 can be a hybrid drive train, which also contains an internal combustion engine. The internal combustion engine 17 can also power the motor vehicle 1 in the parallel P2 architecture of the hybrid drive train 7 shown in FIG. 2, when a clutch K0 between the internal combustion engine 17 and the electric machine 8 is engaged. The internal combustion engine 17 can also be used to power the electric machine 8 to charge the battery. The electric machine 8 can power two front wheels 22 and 23 on the motor vehicle 1 with a positive drive torque applied to the front axle 25 in this exemplary embodiment via the transmission and a front differential transmission 21 (when the clutch is engaged, supported by the internal combustion engine 17). A first rear wheel 26 and second rear wheel 28 on the rear axle 29 of the motor vehicle 1 are not powered in this exemplary embodiment (rear wheel and all wheel drives can also be used). The front wheels 22, 23 and rear wheels 26, 28 can be braked with the brakes 19 in the drive train 7, when the brakes supply a negative braking torque.

A computer program 11 can be stored in the memory 4. The computer program 11 can be executed on the processor 3, for which reason the processor 3 and memory 4 are connected to one another by the communication interface 5. When the computer program 11 is executed on the processor 3, the processor 3 fulfills the functions described in conjunction with the drawings, or executes the steps in the method.

The computer program 11 contains an MPC algorithm 13, which contains a high level solver module 13.1. The MPC algorithm 13 also contains a longitudinal dynamics model 14 for the motor vehicle 1. The high level solver module 13.1 can access the longitudinal dynamics model 14. The MPC algorithm 13 also contains a high level cost function 15.1 that is to be minimized, which is dedicated to the high level solver module 13.1. The high level solver module 13.1 is designed to propose an optimized operation of the motor vehicle 1, e.g. with regard to speed limits and stops, as well as traffic lights and inclines.

The longitudinal dynamics model 14 comprises a loss model 27 for the motor vehicle 1. The lost model 27 describes the operating behavior of components that are relevant with regard to efficiency, e.g. the electric machine 8, internal combustion engine 17, and brakes 19. Overall losses in the motor vehicle 1 can be derived therefrom. The processor 3 executes the MPC algorithm 13 and predicts the behavior of the motor vehicle over the course of a dynamic, route-based high level prediction horizon 24 (FIG. 4) with a length of 50 meters to 5,000 meters. This prediction is based on the longitudinal dynamics model 14. The processor 3 calculates an optimized high level longitudinal trajectory 31 with the high level solver module 13.1, according to which the motor vehicle 1 is to travel within the high level prediction horizon 24.

The optimized high level longitudinal trajectory 31 is calculated for an upcoming route segment taking the longitudinal dynamics model 14 into account, in which the high level cost function 15.1 is minimized. The high level solver module 13.1 assumes the rough, long-term planning for the longitudinal trajectory 31 and uses the MPC approach for this. The rough, long-term planning of the high level longitudinal trajectory 31 is based on the route. This allows for a correct, optimal dealing with inanimate horizon objects (inclines, speed limits, and other traffic signs, e.g. "Stop" or "Yield" signs, curves, traffic lights). The high level longitudinal trajectory 31 comprises a speed trajectory 31.1 in this exemplary embodiment, according to which the motor vehicle 1 is to travel within the high level prediction horizon 24. Points along the route that the motor vehicle 1 passes are assigned optimized speeds for this. The high level longitudinal trajectory 31 can also comprise an optimized course 31.2 of a charging state for the battery 9. The high level longitudinal trajectory 31 can also comprise a braking force trajectory 31.3 for the brakes 19, according to which the brakes 19 are to provide braking forces within the high level prediction horizon 24.

In addition to the high level solver module 13.1, the MPC algorithm 13 also comprises a tracker solver module 13.2 with a dedicated tracker cost function 15.2. The tracker solver module 13.2 can access the longitudinal dynamics model 14. The high level longitudinal trajectory 31 calculated by the high level solver module 13.1 is also sent to the tracker solver module 13.2 as an input, e.g. by the processor 3, through the communication interface 5. The tracker solver module 13.2 is designed to propose an optimized operation of the motor vehicle 1, in particular with regard to maintaining distance to other objects, and preventing collisions.

The processor 3 executes the tracker solver module 13.2. The tracker solver module 13.2 contains instructions, or program code, with which the processor 3 calculates a tracker longitudinal trajectory 32 based on the high level longitudinal trajectory 31 calculated by the high level solver module 13.1 for a future time interval, according to which the motor vehicle 1 is to travel within a time-based tracker prediction horizon 30 (e.g. of 2 seconds). The tracker prediction horizon is significantly shorter than the high level prediction horizon. By way of example, the tracker prediction horizon 30 can cover those points along the route in the high level speed trajectory 31.1 that the motor vehicle 1 will pass in the next two seconds (at speeds in accordance with the speed trajectory 31.1). In this manner, the tracker prediction horizon 30 only covers an initial segment of the high level prediction horizon 24, as is illustrated by way of example in FIG. 4. The tracker longitudinal trajectory 32 comprises a braking force trajectory 32.1 for the brakes 19 in this exemplary embodiment, according to which the brakes 19 are to provide braking forces within the tracker prediction horizon 30. The tracker longitudinal trajectory 32 also comprises a torque trajectory 32.2 for the electric machine 8, and potentially for the internal combustion engine 17, according to which the electric machine 8, and potentially the internal combustion engine 17, are to provide drive torques within the tracker prediction horizon 30.

The detection unit 6 can measure current state variables for the motor vehicle 1, record the corresponding data, and send this to the high level solver module 13.1, the tracker solver module 13.2, and to a post processing unit 16, which is described below. Furthermore, information regarding stationary objects and/or route data from an electronic map in a navigation system 20 for the motor vehicle 1 can be updated cyclically for a forecast horizon, or prediction horizon (e.g. 500 meters) in front of the motor vehicle 1, and sent to the modules 13.1, 13.2 and 16. The route data can contain information relating to elevation gains, curves, and speed limits, as well as traffic lights and stops. Furthermore, a maximum lateral acceleration can be calculated for the motor vehicle 1 when travelling through a curve. The detection unit 6 can also locate the motor vehicle 1, in particular from a signal generated by a GNSS sensor 12, in order to precisely locate the vehicle in the electronic map. The detection unit 6 can also contain an environment sensor 33 for detecting objects in the vehicle's 1 environment, e.g. a radar sensor, camera system, and/or lidar sensor. Dynamic objects within the environment of the vehicle 1 can also be detected therewith, e.g. other vehicles or pedestrians. The processor 3 can access information regarding these objects via the communication interface 5 for example. This information can be entered in the longitudinal model 14 of the motor vehicle 1, in particular as limits or constraints for the calculation of the high level longitudinal trajectory 31 and/or the tracker longitudinal trajectory 32.

The output of the optimization by the MPC algorithm 13 relates to optimal speeds 31.1 of the motor vehicle 1, and rotational torques 32.1 of the electric machine 8, or the internal combustion engine 17, or braking forces 32.1 of the brakes 19, and charging states 31.2 of the battery 9 for certain times and locations that are calculated within the prediction horizons 24, 30. The torque trajectory 32.2 and braking force trajectory 31.1 proposed by the tracker solver module 13.2 are sent to a post processing unit 16 in the present invention, which shall be explained in greater detail below in reference to FIG. 3. The post processing unit 16 is also provided with the data described above from the detection unit 6 and the high level longitudinal trajectory 31.

The post processing unit 16 is designed to calculate drive and braking forces, and recuperation limits. Furthermore, a requirement for stopping the motor vehicle 1 is also to be calculated, and an exit flag check is to be carried out. The torque trajectory 32.2 and braking force trajectory 31.1 proposed by the tracker solver module 13.2 are processed in the post processing unit 16 to obtain a control signal 34, which contains values with which the motor vehicle 1 can be controlled, e.g. by controlling the actuators in the motor vehicle 1. The control signal 34 can contain drive forces (stronger to none), braking forces (weaker to none), limit values for recuperation torques, or a stop signal ("flag vehicle stop") for the motor vehicle 1. The data from the detection unit 6, the navigation system 20, and/or the high level longitudinal trajectory 31 can be used to calculate the control signal 34. Furthermore, the tracker solver module 13.2 and the post processing unit 16 can be queried simultaneously, such that both modules 13.2, 16 start their calculations at the same time.

REFERENCE SYMBOLS

K0 clutch
1 vehicle
2 system
3 processor
4 memory
5 communication interface
6 detection unit
7 drive train
8 electric machine
9 battery
10 transmission
11 computer program
12 GNSS sensor
13 MPC algorithm
13.1 high level solver module
13.2 tracker solver module
14 longitudinal dynamics model
15.1 high level cost function
15.2 tracker cost function
16 post processing unit
17 internal combustion engine
18 power electronics
19 brakes
20 navigation system
21 front differential transmission
22 front wheel
23 front wheel
24 route-based high level prediction horizon
25 front axle
26 rear wheel
27 loss model
28 rear wheel
29 rear axle
30 time-based tracker prediction horizon
31 high level longitudinal trajectory
31.1 speed trajectory (high level)
31.2 charging state trajectory (high level)
31.3 braking force trajectory (high level)
32 tracker longitudinal trajectory
32.1 braking force trajectory (tracker)
32.2 torque trajectory (tracker)
33 environment sensor
34 control signal

The invention claimed is:

1. A method for model-based predictive control (MPC) of a motor vehicle, comprising:

executing an MPC algorithm, which comprises a high level solver module, wherein a high level longitudinal trajectory is calculated by the high level solver module for an upcoming route segment, according to which the motor vehicle is to travel within a route-based high level prediction horizon, sending the high level longitudinal trajectory calculated by the high level solver module to a tracker solver module in the MPC algorithm as an input;

calculating a tracker longitudinal trajectory based on the high level longitudinal trajectory calculated by the high level solver module with the tracker solver module, according to which the motor vehicle is to travel within a time-based tracker prediction horizon, wherein the time-based tracker prediction horizon is a future time interval during which the vehicle is to travel and is shorter than the high level prediction horizon, such that the time-based tracker prediction horizon only covers a portion of the high level prediction horizon; and controlling the motor vehicle based on the tracker longitudinal trajectory.

2. The method according to claim 1, comprising:

calculating the tracker longitudinal trajectory with a higher resolution than the high level longitudinal trajectory.

3. The method according to claim 1, wherein a length of the high level prediction horizon is 50 meters to 5,000 meters.

4. The method according to claim 1, wherein controlling the motor vehicle based on the tracker longitudinal trajectory comprises:

sending the tracker longitudinal trajectory calculated by the tracker solver module to a post processing unit as an input value;

processing the longitudinal trajectory calculated by the tracker solver module in the post processing unit to obtain a control signal; and controlling the motor vehicle on the basis of the control signal.

5. The method according to claim 1, wherein the MPC algorithm comprises a longitudinal dynamics model and a high level cost function dedicated to the high level solver module, and the high level longitudinal trajectory is calculated taking the longitudinal dynamics model into account, while minimizing the high level cost function.

6. The method according to claim 1, wherein a tracker cost function is dedicated to the tracker solver module, and the tracker longitudinal trajectory is calculated taking a longitudinal dynamics model into account, while minimizing the tracker cost function.

7. The method according to claim 1, wherein the high level longitudinal trajectory comprises a speed trajectory, according to which the motor vehicle is to travel within the high level prediction horizon.

8. The method according to claim 1, wherein the high level longitudinal trajectory comprises a course of a charging state of a battery, which serves as a power storage for an electric machine in the motor vehicle, wherein the motor vehicle is powered by the electric machine.

9. The method according to claim 1, wherein the high level longitudinal trajectory and the tracker longitudinal trajectory comprises a braking force trajectory for brakes in the motor vehicle according to which the brakes are to provide braking forces within the high level predication horizon and within the time-based tracker prediction horizon.

10. The method according to claim 1, wherein the tracker longitudinal trajectory comprises a torque trajectory for at least one drive assembly in the motor vehicle, according to which the at least one drive assembly is to provide drive torques within the time-based tracker prediction horizon.

* * * * *